United States Patent
Rosetta et al.

(10) Patent No.: US 12,453,436 B2
(45) Date of Patent: Oct. 28, 2025

(54) COFFEE GRINDER WITH LOW ACOUSTIC IMPACT

(71) Applicant: De'Longhi Appliances S.R.L., Treviso (IT)

(72) Inventors: Simone Rosetta, Treviso (IT); Marco De Zotti, Treviso (IT); Davide Sgnaolin, Treviso (IT); Guido Quaratesi, Treviso (IT)

(73) Assignee: De'Longhi Appliances S.R.L., Treviso (IT)

( * ) Notice: Subject to any disclaimer, the term of this patent is extended or adjusted under 35 U.S.C. 154(b) by 1036 days.

(21) Appl. No.: 17/607,109

(22) PCT Filed: May 19, 2020

(86) PCT No.: PCT/EP2020/063894
§ 371 (c)(1),
(2) Date: Oct. 28, 2021

(87) PCT Pub. No.: WO2020/234265
PCT Pub. Date: Nov. 26, 2020

(65) Prior Publication Data
US 2022/0225818 A1    Jul. 21, 2022

(30) Foreign Application Priority Data

May 20, 2019 (IT) .................. 102019000007026

(51) Int. Cl.
*A47J 31/42* (2006.01)
*A47J 31/44* (2006.01)

(52) U.S. Cl.
CPC ........... *A47J 31/42* (2013.01); *A47J 31/4403* (2013.01)

(58) Field of Classification Search
CPC ........ B01D 45/06; B01D 45/08; B01D 5/009; B01D 5/0093; B01D 53/265;
(Continued)

(56) References Cited

U.S. PATENT DOCUMENTS 1,789,334 A    1/1931  Englund
6,389,957 B1 *  5/2002  Sham ................. A47J 31/42
                                                  99/287

FOREIGN PATENT DOCUMENTS

CN       105686643 A  *  6/2016  ............... A23F 5/08
DE    102010000239 A1     8/2010
(Continued)

OTHER PUBLICATIONS

Translation of CN-105686643-A (Year: 2016).*
Translation of WO-2019000211-A1 (Year: 2019).*
International Search Report dated Jul. 15, 2020; International Application No. PCT/EP2020/063894; International Filing Date: May 19, 2020; 4 pages.
Written Opinion dated Jul. 15, 2020; International Application No. PCT/EP2020/063894; International Filing Date: May 19, 2020; 5 pages.
(Continued)

*Primary Examiner* — Elizabeth M Kerr
*Assistant Examiner* — Adam M Eckardt
(74) *Attorney, Agent, or Firm* — Blank Rome LLP

(57) ABSTRACT

The coffee machine (1) comprises a brewing unit, a hopper (2) for containing a plurality of coffee beans, a grinder (3) for grinding coffee beans, a frame (4) comprising a compartment (5), the compartment (5) has a zone for housing the hopper (2), a zone for housing the grinder (3) and a zone for housing the brewing unit, and a shaped elastomeric membrane (6) for sound insulation positioned in the compartment (5) and extending below said hopper (2) to fill the empty space present in said compartment (5).

17 Claims, 3 Drawing Sheets

(58) Field of Classification Search
CPC .......... F28D 1/05316; F28D 2021/0038; F28F 17/005; F28F 17/00; B60R 2021/343; B60R 2021/346; B60R 21/34; A47J 31/42; A47J 31/44; A47J 31/4403; A47J 31/22; A47J 31/32; A47J 31/00; A47J 31/24; F24F 3/14; B62D 25/02; B62D 25/10; B62D 25/12; F04C 18/0215; F04C 18/0246; F04C 2210/26; F04C 2240/10; F04C 29/028; F04C 29/02; B29C 2049/2404; B29C 45/14475; B29C 45/14778; B29C 49/24; B29C 2949/3032; B29C 2949/3076; B29C 49/0691; B29C 99/286; B29C 99/287; B29C 99/289; B29C 99/302; B29C 99/307; B29C 99/308; B29C 241/791; B29C 241/792; B29C 464/36; B29C 494/64; B29C 264/299; B29C 428/35; B27K 3/50; C08K 3/02; F04B 53/04; D01H 5/74

See application file for complete search history.

(56) References Cited

FOREIGN PATENT DOCUMENTS

FR          2999897 A1    6/2014
WO    WO-2019000211 A1 *  1/2019  .............. A47J 31/42

OTHER PUBLICATIONS

English translation; Chinese Publication No. CN105686643; Publication Date: Jun. 22, 2016; 19 pages.
English translation; German Publication No. DE102010000239; Publication Date: Aug. 26, 2010; 8 pages.
English translation; France Publication No. FR2999897; Publication No. Dec. 12, 2012; 12 pages.
English translation; International Publication No. WO2019000211; Publication Date: Jan. 3, 2019; 11 pages.

* cited by examiner

COFFEE GRINDER WITH LOW ACOUSTIC IMPACT

RELATED APPLICATIONS

This application is a U.S. national phase application of International Application No. PCT/EP2020/063894, filed May 19, 2020; which application claims benefit of priority of Italy Application No. 102019000007026, filed May 20, 2019. Each of the above-identified related applications are incorporated by reference.

FIELD OF USE

The present invention refers to a coffee machine with reduced acoustic emission and to a soundproofing process for soundproofing a coffee machine.

BACKGROUND OF THE INVENTION

Automatic coffee machines present on the market are particularly noisy during the preparation and dispensing of the drink.

The main sources of noise can be attributed to the activation of the water pump, the grinding of the beans and the movement of the brewing unit. Among these, the grinding of the beans is the most significant source of noise.

Automatic coffee machines of the known type comprise a hopper of coffee beans, a grinder and a brewing unit housed in a compartment of the coffee machine frame. Normally, the grinder is positioned in the rear part of the coffee machine interposed between the hopper and the brewing unit. During operation, the grinder receives the coffee beans to be ground from the hopper and dispenses the ground coffee powder to the brewing unit through a relevant rigid contact.

During the coffee bean grinding step, the grinder develops vibrations that are transmitted to the other components in contact therewith, the hopper, conduit and frame of the machine, and the sound waves are amplified by the large and uninterrupted empty spaces present in the housing compartment of the hopper, grinder and brewing unit.

The only anti-vibration elements usually present in coffee machines are dampening elements positioned in the support points of the grinder with the frame. The remaining components are rigid and in connection with each other, therefore the vibrations emitted by the grinder are transmitted to the components generating noise.

To overcome the high degree of noise, in recent years, some rigid components have been replaced with others made of rubber material such as, for example, the dispensing conduit of the coffee ground by the grinder to the brewing unit, and anti-vibration gaskets have also been introduced between the hopper and the grinder and acoustic insulation panels above the grinder.

However, these modifications suffer from numerous disadvantages.

In the first place, a plurality of separate and distinct anti-vibration elements leave empty spaces in the housing compartment around the grinder and above it in which the sound waves and vibrational waves can resonate and act as sound amplification speakers.

In the second place, the plurality of separate elements makes the assembly difficult in terms of time and the manufacturing thereof disadvantageous in terms of costs.

Furthermore, the use of distinct and separate anti-vibration elements allows not only the propagation of vibrations but also the heat produced by the grinder and the steam produced by the brewing unit to reach the hopper of coffee beans heating it, ruining the organoleptic properties of the coffee beans.

Likewise, a further disadvantage of the use of distinct and separate anti-vibration elements is that of having numerous joints that allow the spread of dust and reduce the degree of cleanliness inside the coffee machine.

SUMMARY OF THE INVENTION

An object of the present invention is to realise a coffee machine that solves the mentioned problems of the prior art, in particular that limits the propagation of the vibrations generated by the grinder.

A further object of the present invention is that of providing a coffee machine with improved preservation performance for the coffee beans of the hopper with respect to what is known in the state of the art.

Another object of the present invention is also to realise a coffee machine having a high degree of internal cleanliness.

Finally, the object of the present invention is to soundproof a coffee machine simply and effectively.

The technical task, as well as these and other objects according to the present invention are achieved by realising a coffee machine comprising a brewing unit, a hopper for containing a plurality of coffee beans, a grinder for grinding coffee beans, a frame comprising a compartment, said compartment having a zone for housing said hopper, a zone for housing said grinder and a zone for housing the brewing unit, characterised in that it comprises a shaped elastomeric membrane for sound insulation positioned in said compartment and extending below said hopper to fill the empty space present in said compartment.

Advantageously, the membrane interrupts the continuity of the empty space present inside the compartment.

Advantageously, the membrane is interposed between the hopper and the grinder.

Advantageously, the membrane comprises a first through opening connecting an unloading mouth of the coffee beans of the hopper and a receiving mouth of coffee beans of the grinder.

Advantageously, the membrane comprises a first gasket that extends perimetrally to the first opening for the seal between the unloading mouth and the receiving mouth.

Advantageously, the housing zone for housing the hopper comprises a perimeter shoulder and the membrane perimetrally has a second gasket engaged with said shoulder.

Advantageously, the membrane comprises a primary conduit for conveying to the brewing unit the coffee powder dispensed by the grinder comprising an inlet opening and an outlet opening.

Advantageously, the membrane comprises a third inlet gasket that sealingly connects said inlet opening with a dispensing mouth of the coffee powder of the grinder.

Advantageously, the primary conveying conduit is positioned through an opening of the compartment that connects the housing zone of the brewing unit and the housing zones of the hopper and the grinder.

Advantageously, the membrane comprises a fourth gasket that extends perimetrally outside the conveying conduit for the seal with the opening of the compartment.

Advantageously, the membrane comprises a secondary conveying conduit of the coffee powder to the brewing unit and a fifth perimeter gasket of said secondary conduit for the sealing connection thereof with a slide for the manual loading of coffee powder.

Other characteristics of the present invention are also defined in the following claims.

BRIEF DESCRIPTION OF THE DRAWINGS

Further characteristics and advantages of the invention will become more apparent from the description of a preferred, but not exclusive, embodiment of the coffee machine, which is illustrated by way of approximate and non-limiting example in the attached drawings, of which.

DETAILED DESCRIPTION OF THE ILLUSTRATED EMBODIMENTS

Figure 1:
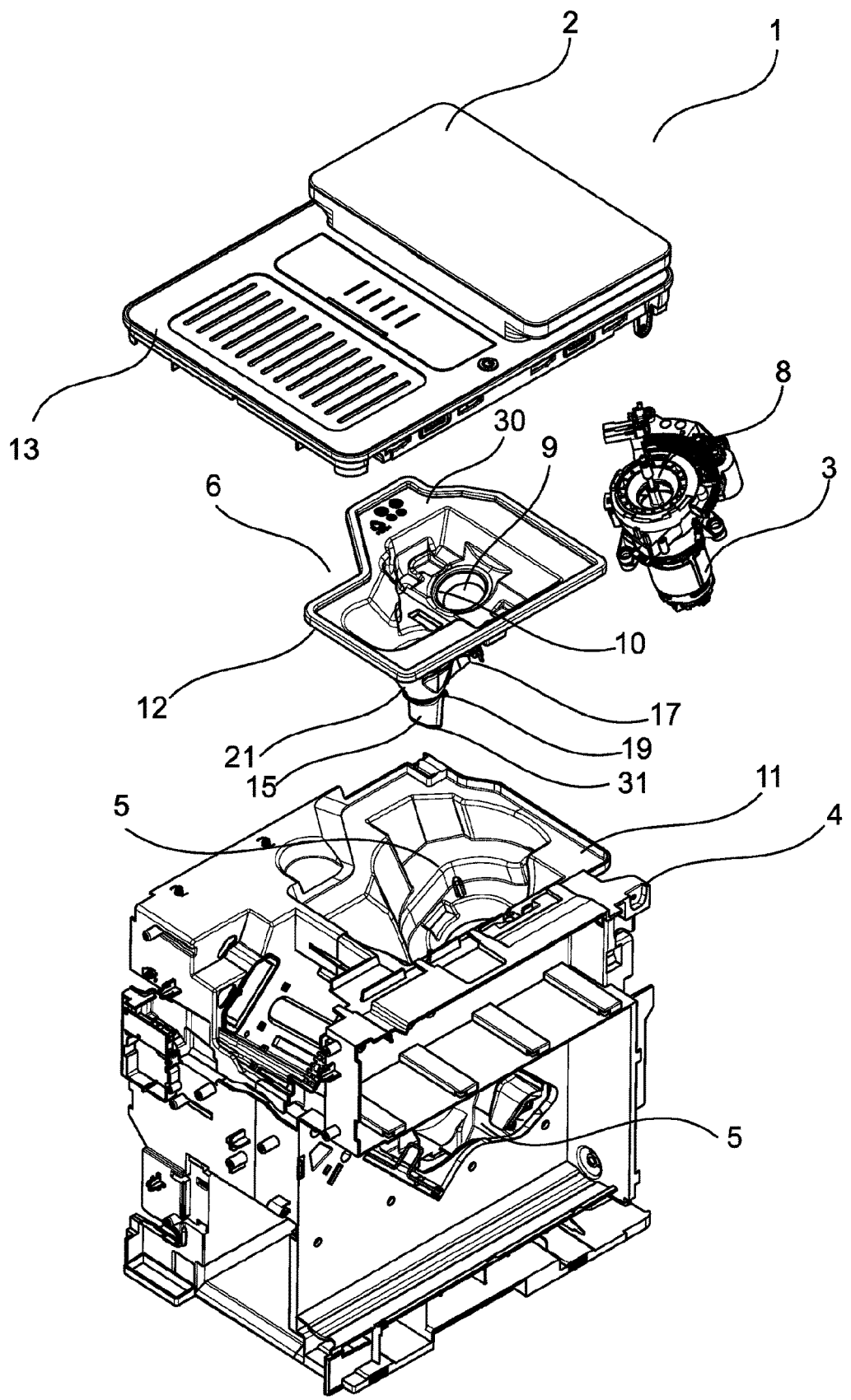
FIG. 1 shows an exploded view of the coffee machine, which is the object of the present invention, in accordance with an embodiment.
Figure 2:
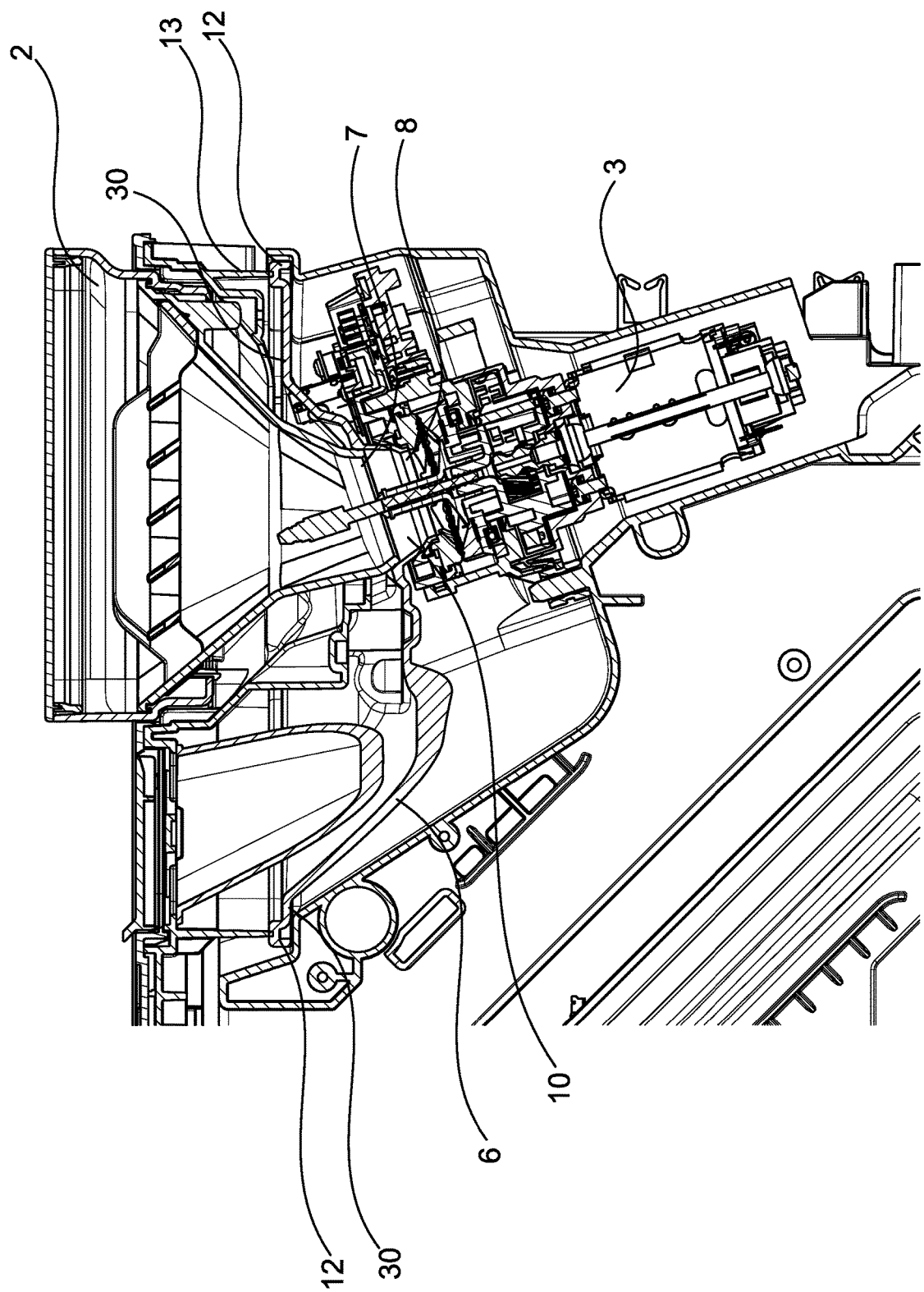
FIG. 2 shows a first section of the coffee machine of FIG. 1 assembled, in accordance with an embodiment.
Figure 3:
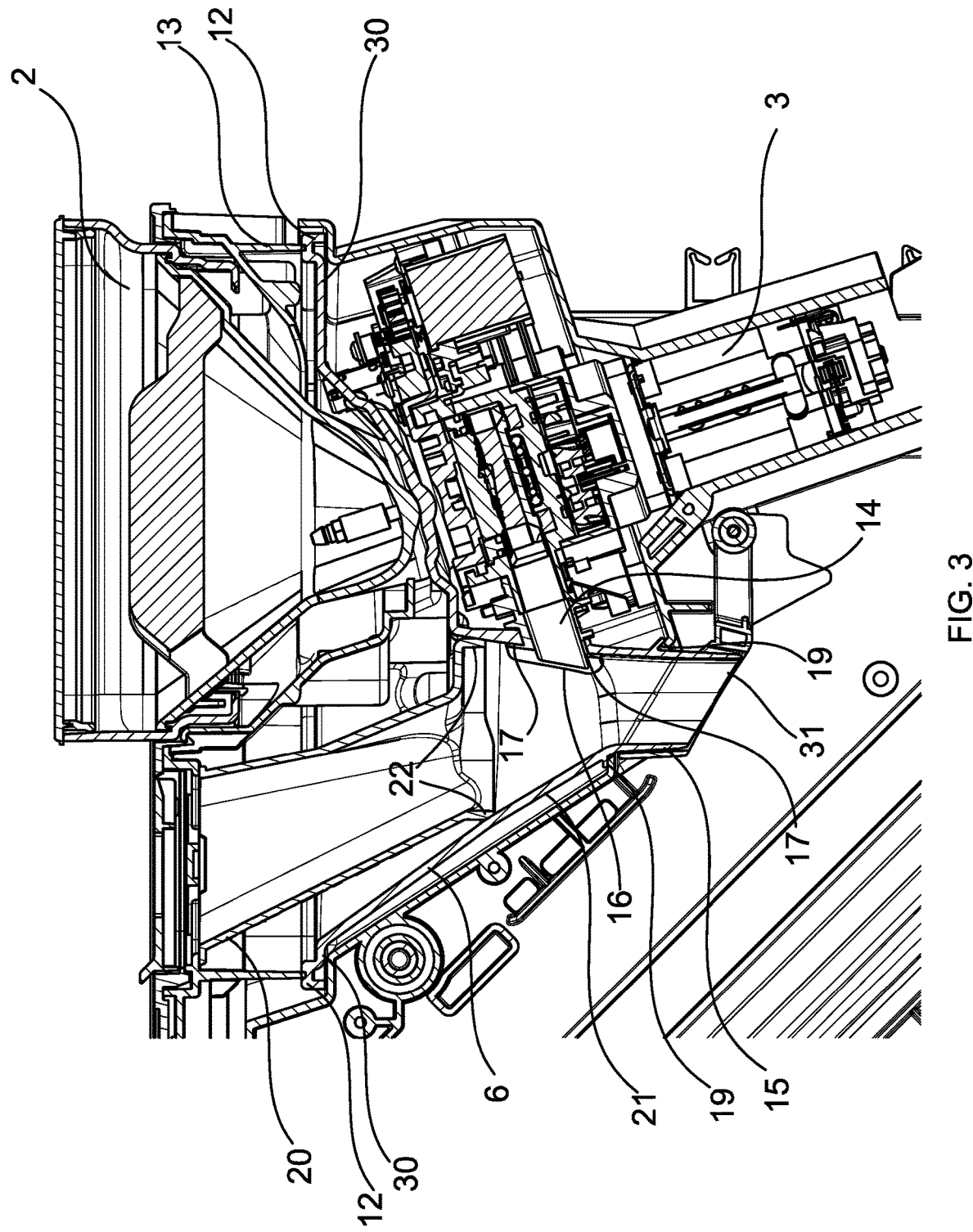
FIG. 3 shows a second section of the coffee machine of FIG. 1 assembled, in accordance with an embodiment.

With reference to the figures cited, a coffee machine is shown, which is generally indicated by number 1.

The coffee machine 1 comprises a brewing unit (not shown), a hopper 2 containing a plurality of coffee beans equipped with an unloading mouth 7 for unloading the coffee beans and a grinder 3 for grinding the coffee beans equipped with a receiving mouth 8 for receiving the coffee beans.

The coffee machine 1 comprises a frame 4 that has a compartment 5.

The compartment 5 has a housing zone for housing the hopper 2, a housing zone for housing the grinder 3 and a housing zone for housing the brewing unit.

The grinder 3, fixed to the frame, is positioned in the compartment 5 in an interposed position between the hopper 2 and the brewing unit.

According to a particular aspect of the invention the coffee machine 1 comprises a shaped elastomeric membrane 6 for sound insulation positioned in the compartment 5.

The membrane 6 extends below the hopper 2 filling the empty space present in the compartment 5.

The membrane 6 in particular is interposed between the hopper 2 and the grinder 3. Advantageously, the membrane 6 forms a physical barrier to the propagation of the vibrations and noise generated by the grinder when it is operating.

The membrane 6 comprises a first through opening 9 connecting the unloading mouth 7 of the hopper 2 and the receiving mouth 8 of the grinder 3.

Advantageously, the membrane 6 comprises a first gasket 10 that extends perimetrally to the first opening 9 for the sealing connection between the unloading mouth 7 of the hopper 2 and the receiving mouth 8 of the grinder 3.

Preferably, the first gasket 10 is a bellows gasket.

In particular, the first gasket 10 is positioned outside the unloading mouth 7 and inside the receiving mouth 8.

According to a particular aspect of the invention, the membrane 6 has a concave portion surrounding a lower portion of the hopper including the unloading mouth 7.

It is to be noted that the housing zone for housing the hopper 2 comprises a perimeter shoulder 11, which is preferably flat.

Even more preferably, the perimeter shoulder 11 extends along a closed line that perimetrally delimits the upper end of said compartment 5.

The membrane 6 perimetrally has a second gasket 12, particularly but not necessarily with a U-shaped section, engaged with the shoulder 11.

In particular, the second gasket 12 delimits an upper end of the membrane 6.

In a preferred embodiment, the second gasket 12 extends from a flat perimeter flange 30 of the membrane 6 conjugated to the shoulder 11.

It is to be noted that the coffee machine 1 comprises a closing cover 13 for closing the compartment 5.

The cover 13 clamps the second gasket 12 against the shoulder 11.

In a preferred embodiment, the hopper 2 is supported in a fixed way by said cover 13.

The first gasket 10 enables the vibrations transmitted to the hopper 2 to be dampened while the second gasket 12 allows the vibrations transmitted to the cover 13 to be dampened, whereas the membrane 6, thanks to its position interposed between the hopper 2, the grinder 3 and the frame 4, reduces the empty space present in the compartment and interrupts the continuity of the empty space present in the compartment between the hopper 2 and the grinder 3 so as to limit the amplification and propagation upwards of the sound waves generated by the grinder.

Advantageously, on one hand, the membrane 6, thanks to the first gasket 10 and the second gasket 12, forms not only a physical barrier for the propagation of noise but also a thermal insulation barrier for the heat generated by the motor of the grinder 3.

Therefore, the membrane 6 also allows the organoleptic properties of the coffee beans contained in the hopper 2 to be left unaltered.

Preferably, the membrane 6 comprises a primary conduit 15 for conveying to the brewing unit the coffee powder dispensed by the grinder 3.

In particular, the primary conduit 15 is equipped with an inlet opening 16 and an outlet opening 31.

The outlet opening 31 of the primary conduit 15 faces the housing zone of the brewing unit for loading a brewing chamber.

The membrane 6 has a third gasket 17 perimetral to said inlet opening 16 that sealingly connects the inlet opening 16 with the dispensing mouth 14 for dispensing the ground coffee powder to the brewing unit normally provided by the grinder 3.

Preferably, the third gasket 17 is a lip seal gasket connected to the dispensing mouth 14 of the grinder 3.

Thanks to the primary conduit 15 and the third sealing gasket 17 with the dispensing outlet of the grinder, the membrane 6 further reduces the propagation spaces of the noise generated by the grinder.

The third gasket 17 also prevents the dispersion of coffee powder into the compartment 5.

According to an embodiment, the compartment 5 comprises an opening 18 connecting the housing zone for housing the brewing unit and the housing zones for housing the hopper 2 and the grinder 3, and the primary conduit 15 is positioned through said connection opening 18.

Preferably, the membrane 6 comprises a fourth gasket 19 that extends perimetrally outside the conveying conduit 15 for the sealing connection with the opening 18 of the compartment 5.

Preferably, the fourth gasket 19 is a lip seal gasket.

The fourth gasket 19 separates the housing zone for housing the grinder from the housing zone for housing the brewing unit and, as well as further reducing the propagation of noise of the grinder, it represents a barrier against steam rising into the compartment 5.

According to a further preferred embodiment, the coffee machine comprises a slide 20 for the manual loading of coffee powder, and the membrane 6 comprises a secondary conveying conduit 21 for conveying the coffee powder to the brewing unit.

In particular, the membrane 6 comprises a fifth perimeter gasket 22 of said secondary conduit 21 for the sealing connection thereof with the slide 20.

Preferably, the fifth gasket 22 is a lip seal gasket.

Preferably, the fifth gasket 22 extends inside the secondary conveying conduit 21 and sealingly connects it with a tubular shaped unloading outlet of the slide 20.

According to a preferred embodiment, the slide 20 is supported by the cover 13.

The secondary conveying conduit 21 flows into the primary conveying conduit 15.

Therefore, the membrane 6, sealingly connected with the opening 18 of the compartment 5 thanks to the fourth gasket and sealingly connected with the slide 20 thanks to the fifth gasket 22, forms together with the slide 20 a preferential conveying conduit towards the outside of the coffee machine 1 of the steam emitted by the brewing unit during the operation thereof.

In other words, the membrane forms a physical barrier that prevents the steam emitted by the brewing unit from reaching the hopper and compromising the organoleptic qualities of the coffee beans contained in the hopper.

The present invention further relates to a soundproofing process for soundproofing the coffee machine 1.

The process comprises the step of introducing into the compartment 5 reaching below the hopper 2, the shaped elastomeric membrane 6, interposing it between the grinder 3, the frame 4 and the hopper 2 to fill the empty space present in the compartment 5.

The process comprises the step of forcing the shaped elastomeric membrane 6 to deform to be fitted sealingly into related seats provided in the components of the coffee machine 1.

In particular, according to the present soundproofing process, the membrane 6 is forced to deform to be fitted sealingly between the unloading mouth 7 of the hopper 3 and the receiving mouth 8 of the grinder 3, with the dispensing mouth 14 of the grinder 3 and with an opening 18 of the compartment that connects the housing zone of the brewing unit and the housing zones of the hopper and the grinder.

Advantageously, the provision of a single multifunctional elastomeric membrane 6 makes the soundproofing process extremely simple and intuitive to perform, and the assembly step quick and easy to implement.

The elastomeric membrane can be made for example of silicone or another type of rubber.

The coffee machine 1 as conceived herein is susceptible to many modifications and variations, all falling within the scope of the inventive concept; furthermore, all the details are replaceable by technically equivalent elements. In practice, the materials used, as well as the dimensions, can be any according to the needs and the state of the art.

The invention claimed is:

1. A coffee machine (1) comprising:
a containing hopper (2) for containing a plurality of coffee beans,
a grinder (3) for grinding coffee beans,
a frame (4) comprising a compartment (5), said compartment (5) having at least a housing zone for housing said hopper (2) and a housing zone for housing said grinder (3),
wherein the coffee machine (1) further comprises a shaped elastomeric membrane (6) for sound insulation positioned in said compartment (5) and extending below said hopper (2) to fill empty space present in said compartment (5),
wherein said hopper (2) comprises an unloading mouth (7) for unloading the coffee beans from the hopper (2), and said grinder (3) comprises a receiving mouth (8) for receiving the coffee beans from the hopper (2),
wherein said shaped elastomeric membrane (6) is interposed between said hopper (2) and said grinder (3), said shaped elastomeric membrane (6) comprising a first through opening (9) connecting said unloading mouth (7) and said receiving mouth (8),
wherein said membrane (6) comprises a first gasket (10) extending perimetrally to said first opening (9) for a sealing connection between said unloading mouth (7) and said receiving mouth (8), and
wherein said housing zone for housing said hopper (2) comprises a perimeter shoulder (11) and said membrane (6) perimetrally has a second gasket (12) engaged with said perimeter shoulder (11).

2. The coffee machine (1) according to claim 1, wherein said membrane (6) comprises a concave portion surrounding a lower portion of said hopper (2).

3. The coffee machine (1) according to claim 1, wherein said perimeter shoulder (11) is flat.

4. The coffee machine (1) according to claim 1, wherein said second gasket (12) delimits an upper end of said membrane (6).

5. The coffee machine (1) according to claim 1, wherein said coffee machine (1) further comprises a closing cover (13) for closing said compartment (5) that clamps said second gasket (12) against said perimeter shoulder (11).

6. The coffee machine (1) according to claim 1, wherein said grinder (3) comprises a dispensing mouth (14) for dispensing ground coffee powder from the grinder (3), wherein said shaped elastomeric membrane (6) comprises a primary conveying conduit (15) for conveying the coffee powder dispensed by the grinder (3), said primary conveying conduit (15) being provided with an inlet opening (16) and with an outlet opening (31).

7. The coffee machine (1) according to claim 6, wherein said shaped elastomeric membrane (6) comprises a third gasket (17) perimetral to said inlet opening (16) that sealingly connects said inlet opening (16) with said dispensing mouth (14).

8. The coffee machine (1) according to claim 7, wherein said primary conveying conduit (15) is positioned through an opening (18) in the compartment that connects said housing zones for housing the hopper and the grinder and any other housing zones, said shaped elastomeric membrane (6) comprising a fourth gasket (19) extending perimetrally outside said conveying conduit (15) providing for a sealing connection with said opening (18) of the compartment (5).

9. The coffee machine (1) according to claim 8, further comprising a slide (20), with inlet at a top of the coffee machine (1) adjacent said hopper (2), said slide (20) aligned in parallel with said grinder (3) with a lower end adjacent said dispensing mouth (14) of said grinder (3), for manual loading of coffee powder to the coffee machine (1) as an alternative to use of said grinder (3), wherein said shaped elastomeric membrane (6) comprises a secondary conveying conduit (21) for conveying the coffee powder from the slide (20) or the grinder (3) to the compartment (5) and a fifth perimeter gasket (22) of said secondary conveying conduit (21) providing a sealing connection thereof with said slide (20).

10. The coffee machine (1) according to claim 9, wherein said secondary conveying conduit (21) merges into said primary conveying conduit (15).

11. A soundproofing process for soundproofing a coffee machine (1), where the coffee machine (1) comprises:
   a containing hopper (2) for containing a plurality of coffee beans,
   a grinder (3) for grinding coffee beans,
   a frame (4) comprising a compartment (5) having at least a housing zone for housing the hopper (2) and a housing zone for housing the grinder (3),
   where the process includes the step of inserting a shaped elastomeric membrane (6) into said compartment (5), reaching below said hopper (2), said membrane (6) being interposed between said grinder (3), said frame (4), and said hopper (2), to fill empty space present in said compartment (5),
   where said hopper (2) comprises an unloading mouth (7) for unloading the coffee beans from the hopper (2), and said grinder (3) comprises a receiving mouth (8) for receiving the coffee beans from the hopper (2),
   where said shaped elastomeric membrane (6) is interposed between said hopper (2) and said grinder (3), said shaped elastomeric membrane (6) comprising a first through opening (9) connecting said unloading mouth (7) and said receiving mouth (8), and
   wherein said grinder (3) comprises a dispensing mouth (14) for dispensing ground coffee powder from the grinder (3), wherein said shaped elastomeric membrane (6) comprises a primary conveying conduit (15) for conveying the coffee powder dispensed by the grinder (3), said primary conveying conduit (15) being provided with an inlet opening (16) and with an outlet opening (31).

12. The soundproofing process according to claim 11, wherein said shaped elastomeric membrane (6) is forced to deform to be fitted sealingly into openings of components of said coffee machine (1).

13. A coffee machine (1) comprising:
   a containing hopper (2) for containing a plurality of coffee beans,
   a grinder (3) for grinding coffee beans,
   a frame (4) comprising a compartment (5), said compartment (5) having at least a housing zone for housing said hopper (2) and a housing zone for housing said grinder (3),
   wherein the coffee machine (1) further comprises a shaped elastomeric membrane (6) for sound insulation positioned in said compartment (5) and extending below said hopper (2) to fill empty space present in said compartment (5),
   wherein said hopper (2) comprises an unloading mouth (7) for unloading the coffee beans from the hopper (2), and said grinder (3) comprises a receiving mouth (8) for receiving the coffee beans from the hopper (2),
   wherein said shaped elastomeric membrane (6) is interposed between said hopper (2) and said grinder (3), said shaped elastomeric membrane (6) comprising a first through opening (9) connecting said unloading mouth (7) and said receiving mouth (8), and
   wherein said grinder (3) comprises a dispensing mouth (14) for dispensing ground coffee powder from the grinder (3), wherein said shaped elastomeric membrane (6) comprises a primary conveying conduit (15) for conveying the coffee powder dispensed by the grinder (3), said primary conveying conduit (15) being provided with an inlet opening (16) and with an outlet opening (31).

14. The coffee machine (1) according to claim 13, wherein said shaped elastomeric membrane (6) comprises a third gasket (17) perimetral to said inlet opening (16) that sealingly connects said inlet opening (16) with said dispensing mouth (14).

15. The coffee machine (1) according to claim 14, wherein said primary conveying conduit (15) is positioned through an opening (18) in the compartment that connects said housing zones for housing the hopper and the grinder and any other housing zones, said shaped elastomeric membrane (6) comprising a fourth gasket (19) extending perimetrally outside said conveying conduit (15) providing for a sealing connection with said opening (18) of the compartment (5).

16. The coffee machine (1) according to claim 15, further comprising a slide (20), with inlet at a top of the coffee machine (1) adjacent said hopper (2), said slide (20) aligned in parallel with said grinder (3) with a lower end adjacent said dispensing mouth (14) of said grinder (3), for manual loading of coffee powder to the coffee machine (1) as an alternative to use of said grinder (3), wherein said shaped elastomeric membrane (6) comprises a secondary conveying conduit (21) for conveying the coffee powder from the slide (20) or the grinder (3) to the compartment (5) and a fifth perimeter gasket (22) of said secondary conveying conduit (21) providing a sealing connection thereof with said slide (20).

17. The coffee machine (1) according to claim 16, wherein said secondary conveying conduit (21) merges into said primary conveying conduit (15).

* * * * *